United States Patent Office 2,900,702

Patented Aug. 25, 1959

2,900,702

METHOD OF TREATING SILICON SURFACES

Russell S. Ohl, Fair Haven, N.J., assignor to Bell Telephone Laboratories, Incorporated, New York, N.Y., a corporation of New York No Drawing. Application December 19, 1955
Serial No. 553,697

6 Claims. (Cl. 29—25.3)

This invention relates to methods of processing semiconductive devices and more particularly to methods of treating the surface of silicon.

The principal objects of this invention are to facilitate the manufacture of silicon translating devices, to improve the electrical characteristics of such devices, to stabilize the surface characteristics of silicon against the adverse effects of atmosphere and thereby enable high rectification efficiencies to be realized from point contact rectifiers employed in the millimeter wavelengths, and to retard the deterioration of minority carrier lifetime at silicon surfaces.

In accordance with these objects, one feature of this invention resides in the application of methyl alcohol to a chemically cleaned silicon surface as a final surface stabilization step.

One aspect of the invention, as applied to millimeter silicon rectifiers having tungsten point contacts, involves cleaning both the tungsten and silicon by chemical means such as a hydrofluoric acid etch just prior to bringing them into mutual engagement, then, immersing the silicon and tungsten surfaces in methyl alcohol, drying the methyl alcohol, and within thirty minutes of the time the surfaces have been dried bringing them into contact. This sequence of steps has been found to afford a substantial enhancement in the final electrical characteristics of high frequency rectifiers in that it produces an especially good contact capable of passing substantially higher current densities in the millimeter range of operation than can be realized with units of similar construction which have not been so treated.

Another aspect of the invention resides in retarding minority carrier lifetime deterioration at the surface of silicon bodies for intervals sufficient to enable those bodies to be fabricated into structures which thereafter offer favorable conditions for the maintenance of high carrier lifetimes at the surface by the use of a chemical cleaning in hydrofluoric acid and an immersion in methyl alcohol prior to encapsulation. In the case of silicon bodies containing p-n junctions, it has been found that the minority carrier lifetime on both sides of the junctions in bodies treated in this manner has been maintained at relatively high levels for intervals in excess of twelve hours while exposed to room atmospheres which rapidly deteriorate the surface lifetime of similar untreated bodies. Encapsulation of bodies treated in accordance with this invention in a housing containing a vacuum or inert environment enables the advantages offered by this process to be enjoyed over extended intervals.

This invention and the above and other objects and features thereof will be more fully understood from a consideration of the following detailed description.

Incidental to the advance of the contact rectifier art into millimeter wavelengths, it has become more difficult to maintain reasonable rectification efficiences in the devices. At higher frequencies it has been necessary to reduce the area of contact between the semiconductive crystal and the rectifying metal contact to such an extent that the contacts are required to pass extremely high current densities. Incidental to the reduction of this contact area, contact pressures have been reduced to avoid a distortion and thus the enlargement of the pointed metal electrodes engaging the silicon. At low contact pressures the presence of any resistive film on the surface of the silicon is extremely deterimental, inasmuch as the contact is unable to penetrate this film and engage the true silicon surface. Accordingly, the presence of such films increases the forward resistance of the rectifying characteristic, reduces the rectification efficiency of the device, and, in high frequency applications, gives rise to relatively high conversion losses. In particular, one form of silicon point contact rectifier having a tungsten point which is to be used as a five millimeter wavelength converter, when produced utilizing the final surface processing of this invention, exhibits a conversion loss of about eight decibels as opposed to the same form of device produced without the utilization of this invention which exhibits a conversion loss of twelve decibels.

This five millimeter converter is produced from p-type single crystal silicon of .005 ohm-centimeter resistivity derived from DuPont silicon of a purity in excess of 99.8 percent to which is added 0.02 percent boron. A crystal of this nature may be pulled by withdrawing a semiconductive seed from a melt of silicon as is known to the art. Silicon elements are obtained from the crystal by sawing it into slices about 22 mils thick. These slices are then rough ground with some suitable, relatively coarse abrasive, such as Carborundum, to a thickness of about ten mils. This slice thickness is ultimately reduced to about six mils by the following polishing cycle.

Both faces of the slice are scratch-polished on a metal lap, for example tin, with 800 mesh boron-carbide, then optically polished with sapphire dust at an extremely low pressure in order to limit the depth of the disruption of the crystal surface incidental to the polishing operation. A major portion of the disrupted crystal structure is then removed to reveal a surface having a relatively high degree of crystallographic perfection by oxidizing both faces of the slice in steam at 1000° C. for fifteen minutes. These oxidized surfaces are removed in 24 percent hydrofluoric acid by a fifteen minute immersion therein. An even better quality undisrupted highly pure and highly polished surface is then revealed on both faces of the crystal by a second oxidation step which may be carried out in steam at 1000° C. for thirty minutes. This oxide film is then removed by a fifteen minute etch in 24 percent hydrofluoric acid and one surface of the wafer, after being rinsed in distilled water and dried, is provided with an ohmic, low resistance contact. One suitable contact is formed by evaporating a film of gold on the silicon at 200° C. to 250° C. in a vacuum of about $5 \times 10^{-6}$ centimeters of mercury. It has been found that this film of gold adheres readily to the polished surface, presumably because of the absence of any intervening substances. Further, it can be united with the surface uniformly, due to the high degree of surface perfection, by a diffusion step at a temperature above the silicon-gold eutectic temperature but below that at which substantial diffusion of the gold into the silicon occurs. This may be conveniently effected in a vacuum at 400° C. with a two minute heating cycle.

Wafers for the rectifiers can be derived from a slice processed as above by dicing the slice into squares 14 mils on a side. Dicing can be accomplished by means of a suitable diamond saw while the slice is cemented between two pieces of glass. The dice are separated from the glass backing pieces by immersion in a suitable solvent for the binder. For example, where shellac is employed to bond the glass to the slice, methyl alcohol may be employed as a solvent. Each die is then incorporated in a rectifier subassembly comprising a die support and the die secured thereto by an ohmic contact. The die support can be formed from copper wire as a cylinder thirty mils in diameter having an end normal to the cylinder axis in which a square depression fourteen mils on a side is formed. One satisfactory form of support comprises a copper body electroplated with tin or some other metal, such as gold or platinum, which will not induce a galvanic action with silicon when the two materials are immersed in hydrofluoric acid.

A die is mounted in the square depression and secured by the application of sufficient pressure to cause the plated copper to flow around the silicon and clamp the sides of the wafer. This wafer mounting assembly can then be incorporated in a suitable rectifier housing together with a point contact holder including a tungsten wire of one-half to two mils diameter having a conical point secured to a suitable conductive support by welding, crimping, or brazing. The mounting assembly, in accordance with this invention, is then immersed in hydrofluoric acid having a concentration of 24 percent for about two minutes while the tungsten point is maintained out of contact with the silicon surface to clean off any oxide or other contaminating substances from the two surfaces which are ultimately to be brought into mutual engagement. While the surfaces are still wet with hydrofluoric acid, they are washed in distilled water and immersed in re-agent methyl alcohol. The methyl alcohol functions to remove the water from the surface and to enable a dry surface to be realized.

The resulting surfaces remain free of undesirable contaminants for a sufficient time to enable the tungsten point to be advanced against the silicon and the desired electrical characteristics attained. One such method of achieving this is to advance the tungsten until it engages the silicon and then further advance the mounting structure about one mil to establish a suitable contact pressure. After the contact is made, it appears that the close proximity of the tungsten to the silicon prevents adverse chemical action of the air in the area of the contact, thereby an assembly exhibiting electrical characteristics which have heretofore been unobtainable. The action of the methyl alcohol is thought to come about from the adsorption of the methyl radical on the tungsten and silicon surfaces, thereby temporarily preventing the adsorption of oxygen on the contacting surfaces.

The preceding specific example of a manufacturing process utilizing the invention is not intended as setting forth the limits within which the process may be practiced. The disclosed processing techniques can deviate rather materially from the specific parameters set forth above while continuing to provide advantageous surface properties. Thus, the various oxidation steps can be practiced in air or in steam in temperatures and for times other than those proposed as is known to those skilled in the art. Similarly, the surface stabilization, involving the cleaning in hydrofluoric acid and the immersion in methyl alcohol, need not be practiced at a point when the device is essentially completely constructed, provided, in the case of a contact of tungsten to silicon, the elements are brought into engagement within thirty minutes of the time the methyl alcohol has been dried from the contacting surfaces.

Equally satisfactory results have been realized with final cleaning procedures other than those set forth. The hydrofluoric acid may vary in concentration from ten to about fifty percent. Further, other surface cleaning agents or materials may be employed to clean the silicon prior to its immersion in methyl alcohol. However, it has been established that in order to be effective the methyl alcohol must be applied to surfaces free of contaminants and having a high degree of crystallographic perfection. Hydrofluoric acid has been proposed as a cleaner since it does not readily attack silicon, it does remove any detrimental substances from the surface, and it leaves no residue which is harmful to the ultimate device.

The interval over which the surfaces are exposed to the hydrofluoric acid must be sufficient to remove oxides or other contaminants and, therefore, it is generally found desirable to clean for at least two minutes, although devices have been successfully produced which have been subjected to the acid for substantially longer times, for example, thirty minutes; the upper limit for the cleaning or etching interval is a time less than that which will destroy the device.

The surface cleaning and stabilization should be applied after any processing steps which might further contaminate the surfaces. Therefore, they are essentially the final steps in the fabrication of the device. Care should be taken to avoid subjecting the treated silicon surfaces to excessive heat such as might be encountered in soldering, welding, or alloying and to avoid extensive exposure to the atmosphere. It has been observed that the beneficial effects of surface cleaning and immersion in methyl alcohol deteriorate with time following a logarithmic form so that it is advantageous, when seeking the highest quality of millimeter rectifier, to mount the tungsten contact on the silicon surface within five minutes of the time the surfaces are dried.

The surface stabilization of silicon involving the chemical cleaning of that surface to reveal a chemically clean undisrupted crystal structure, followed by the immersion of that surface in methyl alcohol, has found application with regard to silicon devices other than those characterized by the above-described rectifier structure. Thus, p-n junction silicon devices have been improved by subjecting them to this treatment. In particular, it has been observed that single crystal silicon bodies containing p-n junctions, produced by the drawing of a single crystal seed from a silicon melt, which have been supplied with suitable ohmic connections to the opposite sides of the n-p junction, have exhibited a deterioration of minority carrier lifetime at their surfaces on both sides of the junction to about three microseconds when the etched surfaces in the vicinity of the junction are exposed to air for a few minutes. Similar devices, derived from the same crystal, have had minority carrier lifetimes of greater than ten microseconds twelve hours after removal from a hydrofluoric acid etch when this etch has been followed by an immediate immersion in methyl alcohol, care being taken to insure that the surfaces remain moistened with the etching fluid or a rinsing fluid, if one is used, during the transfer to the methyl alcohol rinse.

It is to be understood that the above-described arrangements are illustrative of the application of the principles of the invention. Numerous other arrangements may be devised by those skilled in the art without departing from the spirit and scope of the invention.

What is claimed is:

1. The method of manufacture of semiconductive devices having a silicon surface which comprises the steps of producing a surface having a high degree of crystallographic perfection, chemically cleaning said surface, immersing said clean surface in methyl alcohol, drying said methyl alcohol from said surface, and removing said surface from exposure to the atmosphere within a period of twelve hours.

2. The method of manufacture of a rectifier intended for operation at millimeter wavelengths which comprises the steps of immersing a silicon surface and a tungsten wire point in hydrofluoric acid, rinsing said surface and said point in distilled water, immersing said surface and said point in methyl alcohol while moist with said water, drying said methyl alcohol from said surface and said point, and engaging said surface with said tungsten point within thirty minutes of the time the drying of said point and said surface.

3. The method in accordance with claim 2 wherein the surface of said silicon body to be contacted by said tungsten point is formed with a high degree of crystallographic perfection by employing a single crystal body of silicon, subjecting the surface of said body to an oxidation process in steam at about 1000° C., and removing the oxidation products from the surface in hydrofluoric acid.

4. The method in accordance with claim 2 wherein said silicon surface and said tungsten point are engaged within five minutes of the drying of said point and said surface.

5. The method of stabilizing the surface of a semiconductive device prior to encapsulation which device contains at least one p-n junction comprising the steps of immersing in a chemical etchant to clean said surface, immersing said surface in methyl alcohol, drying said methyl alcohol from said surface and encapsulating within twelve hours of the drying of said surface.

6. The method of manufacture of a rectifier for operation at millimeter wavelengths which comprises the steps of immersing a silicon surface and a tungsten wire point in an etchant to clean said surface and said point, immersing said surface and said point in methyl alcohol, drying said methyl alcohol from said surface and said point, and engaging said surface with said point within thirty minutes of the drying of said point and said surface.

References Cited in the file of this patent

UNITED STATES PATENTS

| | | |
|---|---|---|
| 2,415,841 | Ohl | Feb. 18, 1947 |
| 2,419,561 | Jones et al. | Apr. 29, 1947 |
| 2,736,847 | Barnes | Feb. 28, 1956 |